Dec. 19, 1961    L. H. AVERBACH    3,013,553
TRACHELOTOME
Filed Dec. 4, 1958
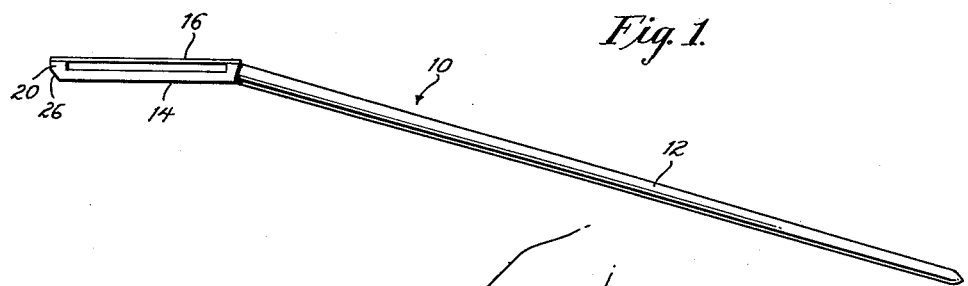
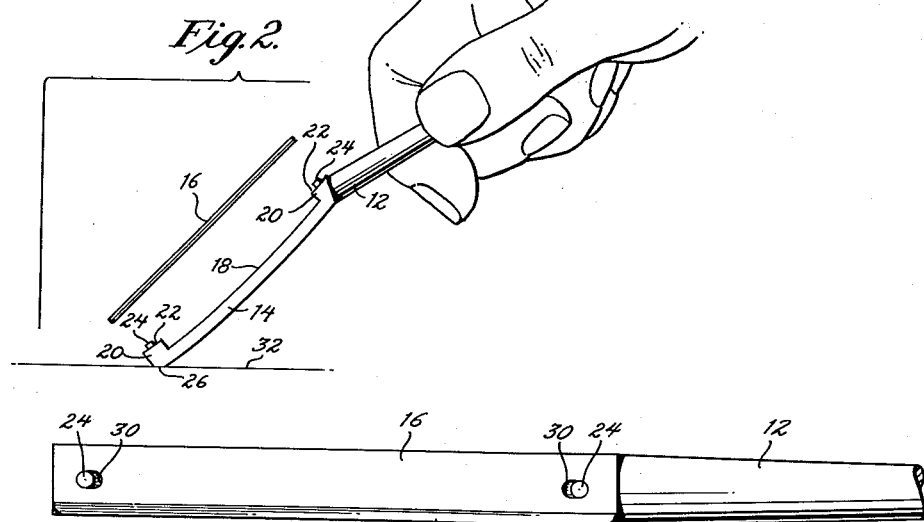
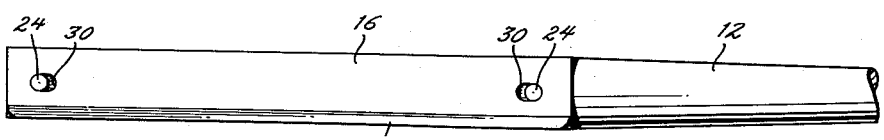
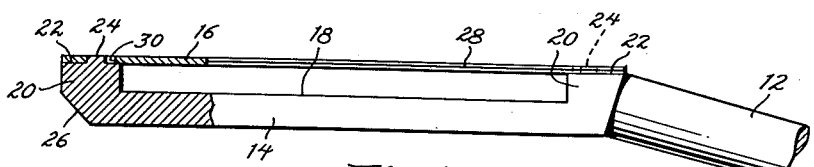
INVENTOR.
LOUIS H. AVERBACH
BY Arthur H. Seidel
ATTORNEY.

3,013,553
TRACHELOTOME
Louis H. Averbach, 5534 Large St., Philadelphia, Pa.
Filed Dec. 4, 1958, Ser. No. 778,217
2 Claims. (Cl. 128—2)

The present invention relates to a trachelotome, and more particularly to a biopsy knife for obtaining biopsies of the cervix of the uterus.

The use of the normal straight scalpel or knife for obtaining biopsies of the cervix of the uterus has many disadvantages. Because of the curvature of the cervix of the uterus, it is difficult to properly position a straight scalpel to obtain a biopsy. Also great care must be taken that the cut is not too deep, for a hemorrhage may be caused. Thus, to make a biopsy cut of uniform depth with a straight scalpel is a difficult task, particularly when operating within the cervix of the uterus.

It is an object of the present invention to provide an improved biopsy knife.

It is another object of the present invention to provide a biopsy knife which is shaped to permit ease of insertion and manipulation in the cervix of the uterus.

It is still another object of the present invention to provide a biopsy knife which cuts a specimen of a definite thickness.

It is a further object of the present invention to provide a biopsy knife in which the blade is easily replaceable.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevational view of the trachelotome of the present invention.

FIGURE 2 is a side elevational view of the trachelotome of the present invention illustrating the manner of attaching the blade to the knife.

FIGURE 3 is a top elevational view of the blade portion of the trachelotome of the present invention.

FIGURE 4 is a partially sectioned side elevational view of the blade portion of the trachelotome of the present invention.

Referring to the drawing, and initially to FIGURE 1, the trachelotome of the present invention is generally designated as 10. Trachelotome 10 comprises a handle 12, a blade holder tip 14 integral with the handle 12, and a removable blade 16.

Handle 12 is made of metal, such as stainless steel, and is preferably of circular or elliptical cross-section. Handle 12 is tapered slightly longitudinally with the free end of handle 12 being of slightly smaller diameter than the end of the handle 12 adjacent the blade holder tip 14.

Blade holder tip 14 extends from the handle 12 at a small angle, preferably approximately fifteen degrees, with respect to the longitudinal axis of the handle 12. The outer side of blade holder tip 14 has a flat, substantially rectangular surface 18. At each end of the flat surface 18 is an upright blade supporting arm 20. Each of the blade supporting arms 20 has a flat surface 22 which is parallel to and spaced from the flat surface 18. A pin 24 projects from each of the flat surfaces 22 of the supporting arms 20. The end of the blade holder tip 14 has a beveled surface 26 the purpose of which will be explained below.

Blade 16 is flat and rectangular. The length and width of blade 16 is substantially the same as the length and width of the blade holder tip 14. Blade 16 is made of surgical steel and has a sharp cutting edge 28 along one side thereof. Blade 16 has an elongated hole 30 therethrough adjacent each end of the blade 16. The distance between the outer ends of the holes 30 is slightly less than the distance between the outer ends of the pins 24 on the blade supporting arms 20.

FIGURE 2 illustrates the manner of attaching the blade 16 to the blade holder tip 14 of the trachelotome 10.

The user, grasping the handle 12 of the trachelotome 10 in his hand, places the beveled end surface 26 of the blade holder tip 14 against a rigid surface 32. While holding the trachelotome 10 at an angle with respect to the surface 32, the user presses downwardly and forwardly on the handle 12. This causes the blade holder tip 14 to become bowed, as shown in FIGURE 2, which moves the pins 24 closer together. With the blade holder tip 14 being held in the bowed disposition, the blade 16 is placed across the flat surface 18 of the blade holder tip 14, and the pins 24 are inserted in the holes 30 in blade 16. Since the holes 30 in the blade 16 are elongated, the extent to which the blade holder tip 14 must be bowed in order to permit the pins 24 to be inserted in the holes 30 is not extremely critical. When the blade 16 is seated on the flat surfaces 22 of the blade supporting arms 20, the pressure on the handle 12 is released. The blade holder tip 14 then straightens out moving the pins 24 away from each other and against the outer ends of the holes 30 in the blade 16. Since the distance between the outer ends of the holes 30 is less than the normal distance between the outer ends of the pins 24, the pins 24 will be pressed tightly against the outer ends of the holes 30, and thereby firmly hold the blade 16 on the blade holder tip 14.

To remove the blade 16, the blade holder tip 14 is bowed in the same manner as described above, and the blade 16 is removed from the pins 24. Thus, the blade 16 can be easily removed from the trachelotome 10 for replacement with a sharper blade 16 or to permit proper sterilization of the trachelotome 10 and the blade 16. When a blade 16 is mounted on the trachelotome 10, the sharp edge 28 of the blade 16 can be placed in either direction to accommodate either a right-handed or left-handed operator.

In the use of the trachelotome 10 of the present invention for obtaining a biopsy of the cervix of the uterus, the angle between the blade holder tip 14 and the handle 12 permits ease of insertion of the trachelotome 10 into the cervix. Also, the angle between the blade holder tip 14 and handle 12 permits proper positioning of the blade 16 for movement along the wall of the cervix to cut a biopsy specimen.

As shown in FIGURE 4, the sharp edge 28 of the blade 16 is spaced slightly from the flat surface 18 of the blade holder tip 14. As the blade 16 cuts a biopsy specimen from the wall of the cervix, the specimen passes through the space between the blade 16 and the flat surface 18. Thus, the flat surface 18 limits the depth of the cut into the wall of the cervix so that the biopsy specimen is of a definite thickness. Since the depth of the cut is limited by the flat surface 18 of the blade holder tip 14, the chances of causing a hemorrhage are greatly minimized. To obtain a biopsy specimen of sufficient thickness and yet not cut too deep to cause a hemorrhage, the spacing between the sharp edge 28 of the blade 16 and the flat surface 18 of the blade holder tip 14 should preferably be approximately two millimeters.

The present invention may be embodied in other specific forms without departing from the spirit or essential attributes thereof and, accordingly, reference should be made to the appended claims, rather than to the foregoing specification as indicating the scope of the invention.

I claim:

1. A trachelotome for cutting a biopsy specimen from the wall of the cervix comprising a handle, a thin flexible blade supporting tip extending from one end of said handle at an acute angle to and in the direction of the longitudinal axis of said handle, said tip having a flat outwardly facing surface, a blade supporting arm extending upright from each end of said flat surface, each of said blade supporting arms having an outer surface spaced from and substantially parallel to said flat surface, a pin projecting from the outer surface of each of said supporting arms, a substantially flat blade having a pair of spaced holes therethrough, the width of said blade being substantially equal to the width of said flat outwardly facing surface on said tip, said blade being mounted on the outer surfaces of said supporting arms and extending across said flat surface, the pins extending through the holes in said blade with the uppermost surface of said pins being flush with the uppermost surface of said blade, the distance between the outer ends of the holes in said blade being slightly less than the normal distance between the outer ends of said pins, said tip being capable of being flexed so as to bring said pins closer together so that said pins may extend through said holes, said pins being held tightly against the periphery of said holes by the resiliency of said blade holder tip in its unflexed position, and said blade being mounted on said supporting tip solely by the engagement of said pins with the periphery of said holes in said blade.

2. A trachelotome in accordance with claim 1 including a beveled surface at the end of said blade supporting tip remote from said handle, said beveled surface being angled with respect to said facing surface, and said beveled surface being remote from said outer surface on one of said blade supporting arms, said last mentioned blade supporting arm being adjacent the end of said blade supporting tip which is remote from said handle.

References Cited in the file of this patent

UNITED STATES PATENTS

| | | |
|---|---|---|
| 63,236 | Force | Mar. 26, 1867 |
| 708,298 | Bausch | Sept. 2, 1902 |
| 1,100,394 | Parker | June 16, 1914 |
| 1,608,813 | Richter | Nov. 30, 1926 |
| 2,729,210 | Spencer | Jan. 3, 1956 |
| 2,778,357 | Leibinger | Jan. 22, 1957 |
| 2,817,899 | Wheeler | Dec. 31, 1957 |